(12) United States Patent
Seipold

(10) Patent No.: US 6,668,952 B2
(45) Date of Patent: Dec. 30, 2003

(54) SHAFT ASSEMBLY WHICH RETAINS A REVERSIBLE SHAFT

(75) Inventor: John M. Seipold, Glasford, IL (US)

(73) Assignee: Caterpillar Inc, Peoria, IL (US)

( * ) Notice: Subject to any disclaimer, the term of this patent is extended or adjusted under 35 U.S.C. 154(b) by 78 days.

(21) Appl. No.: 09/843,523

(22) Filed: Apr. 26, 2001

(65) Prior Publication Data

US 2002/0157892 A1 Oct. 31, 2002

(51) Int. Cl.[7] .............................................. B60K 25/06
(52) U.S. Cl. .................... 180/53.6; 180/53.8; 180/53.7; 403/359.1
(58) Field of Search ........................ 74/15.6; 464/182; 403/359.1; 180/53.7, 53.8, 379, 53.1, 53.6, 53.61, 53.62

(56) References Cited

U.S. PATENT DOCUMENTS

| | | | | |
|---|---|---|---|---|
| 2,380,952 A | * | 8/1945 | Dewey | 464/182 |
| 3,715,704 A | * | 2/1973 | Boyle et al. | 74/15.4 |
| 3,990,550 A | * | 11/1976 | Recker | 192/46 |
| 3,991,629 A | * | 11/1976 | Dearnley | 74/15.4 |
| 4,287,778 A | * | 9/1981 | Quick | 74/15.4 |
| 4,318,630 A | | 3/1982 | Herchenbach et al. | |
| 4,392,759 A | | 7/1983 | Cook | |
| 4,453,852 A | | 6/1984 | Gilcrest | |
| 4,594,906 A | * | 6/1986 | Vincent et al. | 74/15.4 |
| 4,601,601 A | | 7/1986 | Morris | |
| 4,641,990 A | | 2/1987 | Geisthoff | |
| 4,658,662 A | * | 4/1987 | Rundle | 74/331 |
| 4,685,340 A | | 8/1987 | Shust et al. | |
| 4,692,049 A | | 9/1987 | Engle | |
| 4,776,226 A | | 10/1988 | Zenker | |
| 4,832,637 A | * | 5/1989 | Goluba | 440/83 |
| 4,887,680 A | | 12/1989 | Nozaka et al. | |
| 5,658,087 A | | 8/1997 | Butkovich et al. | |
| 5,667,330 A | | 9/1997 | Henkel et al. | |
| 5,957,615 A | * | 9/1999 | Orain | 403/359.1 |
| 6,038,936 A | * | 3/2000 | Butkovich et al. | 74/15.4 |
| 6,234,907 B1 | * | 5/2001 | Moser | 464/134 |

* cited by examiner

Primary Examiner—Paul N. Dickson
Assistant Examiner—Deann Draper
(74) Attorney, Agent, or Firm—Steve M Hanley

(57) ABSTRACT

A removable shaft assembly having a drive shaft with internal splines defined therein and an output shaft positioned within the drive shaft and having a first set of external splines defined thereon adapted to engage the internal splines of the drive shaft is disclosed. The assembly further includes a cap axially aligned with the drive shaft having internal splines defined thereon which are adapted to prevent an axial movement of the output shaft relative to the drive shaft when the cap is in a first position and hallow axial movement of the output shaft relative to the drive shaft when the cap is in a second position. The output shaft may be removed from the drive shaft when the cap is placed in the first position by axially sliding the first set of external splines through the internal splines of the cap. A method of operating a removable shaft assembly is also disclosed.

16 Claims, 2 Drawing Sheets

SHAFT ASSEMBLY WHICH RETAINS A REVERSIBLE SHAFT

TECHNICAL FIELD

The present invention generally relates to a shaft assembly, and more specifically to shaft assembly which retains a reversible shaft.

BACKGROUND

In some applications, it is desirable to be able to change the interface between a drive shaft and a device being driven such that a variety of such devices may be powered by a common drive source. One such application is a power take-off shaft on an agricultural tractor. The power take-off shaft may be needed to drive a variety of implements, such as sprayers or planters, depending on an operator's needs. Typically, agricultural implements fall into two classes, Category II or Category III implements. Some operators may have considerable investment in either Category II implements or Category III implements and may want to invest money into the other category of implements for another application. A drawback to this situation is that the operator typically cannot afford a separate tractor to operate each type of implement.

Additionally, a tractor owner who does own both types of implements wants to be able to interchange between Category II and Category III implements quickly and easily. Unsecuring the existing shaft and securing a new shaft into place may require service tools and may be time consuming. A drawback to requiring the operator to maintain a large number of tools for the interchange operation is that lack of a required tool could make the interchange operation more time consuming which could adversely affect the operators productivity.

What is needed therefore is a shaft assembly which retains a reversible shaft which overcomes the above-mentioned drawbacks.

SUMMARY OF THE INVENTION

In accordance with a first aspect of the present invention, there is provided a removable shaft assembly including a drive shaft having internal splines defined therein and an output shaft positioned within the drive shaft and having a first set of external splines defined thereon adapted to engage the internal splines of the drive shaft. The assembly further includes a cap axially aligned with the drive shaft having internal splines defined thereon which are adapted to prevent an axial movement of the output shaft relative to the drive shaft when the cap is in a first position and to allow axial movement of the output shaft relative to the drive shaft when the cap is in a second position. The output shaft may be removed from the drive shaft when the cap is placed in the first position by axially sliding the first set of external splines through the internal splines of the cap.

In accordance with a second aspect of the present invention, there is provided a method of operating a removable shaft assembly. The method includes the steps of providing a drive shaft having internal splines defined therein and positioning a output shaft having a first set of external splines defined thereon within the drive shaft. The method yet further includes the step of axially aligning a cap having internal splines defined thereon with the drive shaft which prevent a axial movement of the output shaft relative to the drive shaft when the cap in a first position, and allow axial movement of the output shaft relative to the drive shaft when the cap is in a second position. The method still further includes the step of removing the output shaft from the drive shaft when the cap is placed in the first position by axially sliding the first set of external splines through the internal splines of the cap.

In accordance with a third aspect of the present invention, there is provided a work machine having an engine, a transmission driven by the engine with a transmission output shaft and a power takeoff assembly driven by the transmission output shaft and powering a drive shaft having internal splines defined therein. The work machine further includes an output shaft positioned within the drive shaft and having a first set of external splines defined thereon adapted to engage the internal splines of the drive shaft. The work machine yet further includes a cap axially aligned with the drive shaft having an internal splines defined thereon which are adapted to prevent a axial movement of the output shaft relative to the drive shaft when the cap in a first position and allow axial movement of the output shaft relative to the drive shaft when the cap is in a second position. The output shaft may be removed from the drive shaft when the cap is placed in the first position by axially sliding the first set of external splines through the internal splines of the cap.

DETAILED DESCRIPTION

Figure 1:
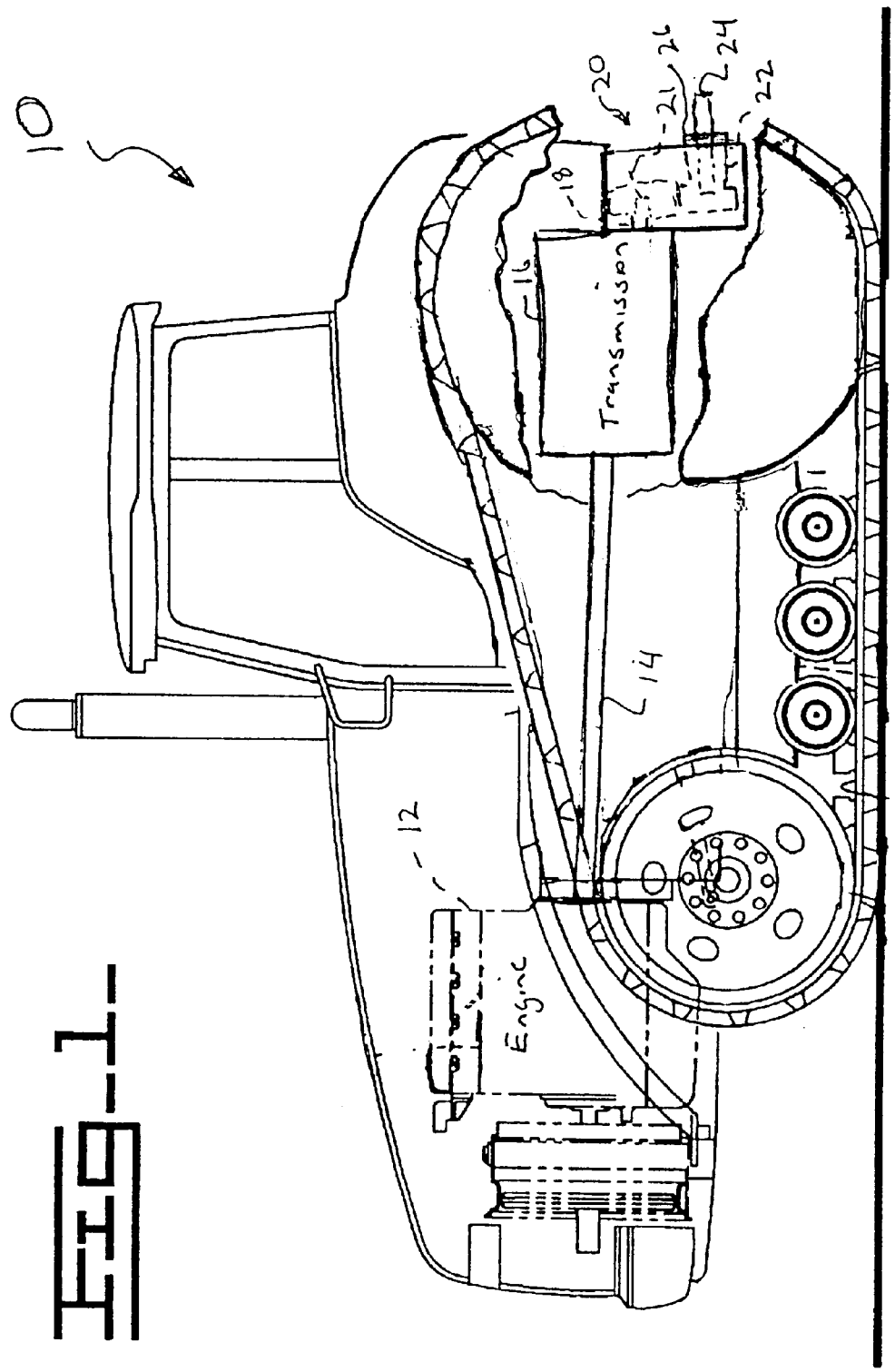
FIG. 1 is a partially cutaway side view of a work machine.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a agricultural tractor, or work machine 10, that incorporates the features of the present invention therein. The work machine 10 includes an engine 12 which drives an engine output shaft 14. The engine output shaft 14 drives a transmission 16. The transmission 16 is operable to select one of a number of gear ratios between the engine output shaft 14 and a transmission output shaft 18. The transmission is connected to a power take-off assembly 20 as is customary. The power take-off assembly 20 includes a clutch 21 operative to transfer power from the transmission to a drive shaft 22 when the clutch 21 is in the engaged state and to prevent power transfer between the transmission and the drive shaft 22 when the clutch 21 is in the disengaged state.

Figure 2:
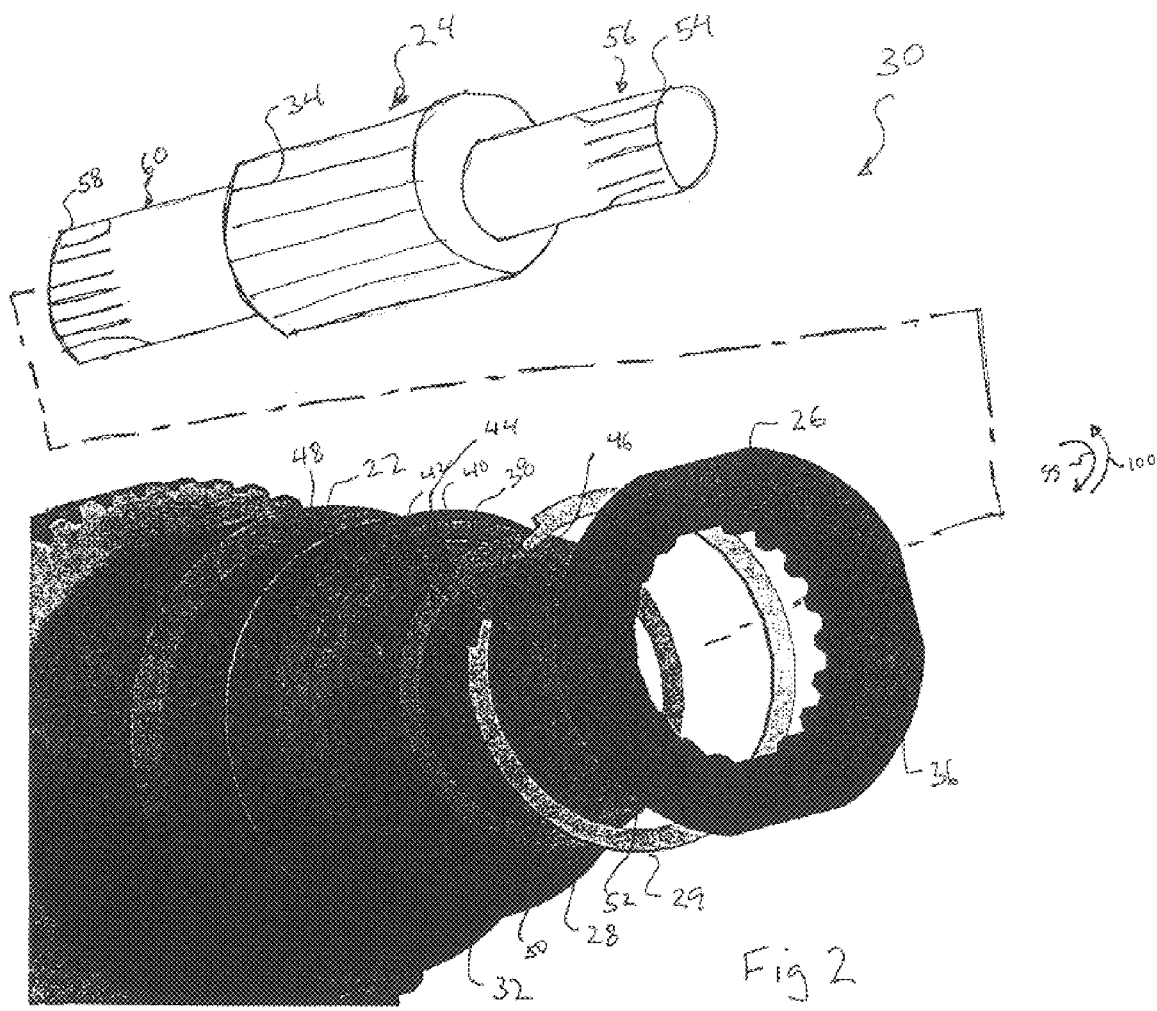
FIG. 2 is an exploded view of a reversible shaft assembly used in the work machine of FIG. 1.

Referring now to FIG. 2, there is shown an exploded view of a removable shaft assembly 30 which includes the drive shaft 22, an output shaft 24, a cap 26, a torsion spring 28 and a snap ring 29. The drive shaft 22 has a set of internal splines 32 defined therein. The output shaft 24 has a first set of external splines 34 defined thereon which are adapted to engage the internal splines 32 defined in the drive shaft 22. When the output shaft 24 is placed within the drive shaft 22, rotation of the drive shaft 22 in the general direction of arrow 99 will cause the output shaft 24 to also rotate in the general direction of arrow 99 whereas rotation of the output shaft 24 in the general direction of arrow 100 will also cause the drive shaft 22 to rotate in the general direction of arrow 100.

The cap 26 is axially aligned with the drive shaft 22. The cap 26 has internal splines 36 defined therein which are adapted to prevent an axial movement of the output shaft 24 relative to the drive shaft 22 when the cap 26 is in a first position. The splines 36 are further adapted to allow axial movement of the output shaft 24 relative to the drive shaft when the cap is in a second position. In particular, the internal splines 32 of the drive shaft 22 are not axially aligned with the internal splines of the cap 26 when the cap 26 is in the first position, and the internal splines 32 of the drive shaft 22 are axially aligned with the internal splines of the cap 26 when the cap 26 is in the second position. It should be appreciated that the output shaft 24 may be either inserted or removed by axially sliding the first set of external splines 34 of the output shaft 24 through the internal splines 36 of the cap 26 when the cap 26 is in the second position.

The torsion spring 28 serves as a biasing member between the drive shaft 22 and the cap 26. A pin 40 secures a first end 38 of the torsion spring 28 to the drive shaft 22 via a hole 42. A second end 44 of the torsion spring 28 is secured to the cap 26 via a pin 46. The pin 46 engages a slot 48 defined in the drive shaft 22. It should be appreciated that by securing the first end 38 of the torsion spring 28 to the drive shaft 22 and securing the second end 44 of the torsion spring 26 to the cap 26, the torsion spring 28 applies a bias force to cap 26 which causes the cap 26 to rotate relative to the drive shaft 22 in the general direction of arrow 100. It should further be appreciated that biasing the cap 26 in the general direction of arrow 100 places the cap 26 in the first position which prevents a an axial movement of the output shaft 24 relative to the drive shaft 22.

The cap 26 is further secured to the drive shaft 22 by snap ring 29. In particular, a first groove 50 is defined on an inner surface of the drive shaft 22 and a second groove is 52 is defined in an outer surface of cap 26. To attach the cap 26 to the drive shaft 22, the snap ring 29 is compressed and the outer surface of the cap 26 is placed within the inner surface of the drive shaft 22. When the first groove 50 of the drive shaft 22 becomes aligned with the second groove 52 of the cap 26, the snap ring 29 expands within the grooves 50, 52 to secure the cap 26 to the drive shaft 22.

The output shaft 24 further has a second set of external splines 54 defined on a first end portion 56. The second set of external splines 54 are adapted to drive a first set of implements. In particular, the first set of implements may be Catagory II agricultural implements as defined by American Society of Agricultural Engineers Standard ASAE S203.13 or ASAE S207.12. Similarly, the output shaft 24 further has a third set of external splines 58 defined on a second end portion 60. The third set of external splines 58 are adapted to drive a second set of implements. In particular, the second set of implements may be Catagory III agricultural implements as defined by American Society of Agricultural Engineers Standard ASAE S203.13 or ASAE S207.12.

Industrial Applicability

In operation, the output shaft 24 may be positioned within the drive shaft 22 by manually rotating the cap 26 in the general direction of arrow 99, overcoming the biasing force of torsion spring 26, from the first position to the second position. To prepare the work machine 10 to use Category II implement, the output shaft 24 is positioned such that the second end portion 60 is axially slid through the drive shaft 22 and cap 26 such that the first end portion 56 extends out from the work machine 10 to drive implements, as shown in FIG. 1. To secure the output shaft 24 to the drive shaft 22, the cap is released and the biasing force of the torsion spring 28 returns the cap 26 to the first position which prevents the output shaft 24 from moving axially relative to the drive shaft 22.

When it is desired drive a Category III implement, the output shaft 24 is first removed from the drive shaft 22 by rotating the cap 26 in the general direction of arrow 99, overcoming the biasing force of torsion spring 28, from the first position to the second position. The output shaft is then flipped 180 degrees such that the first end portion 56 is inserted into the drive shaft 22 and the second end portion 60 extends out from the work machine 10. To secure the output shaft 24 to the drive shaft 22, the cap 26 is released and the biasing force of the torsion spring 28 returns the cap 26 to the first position which prevents the output shaft 24 from moving axially relative to the drive shaft 22. It should be appreciated that this configuration allows and operator to easily configure the output shaft 22 to drive either Catagory II and Catagory III implements without the use of any tools.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A removable shaft assembly, comprising:
a drive shaft having internal splines defined therein;
an output shaft positioned within the drive shaft and having a first set of external splines defined thereon adapted to engage the internal splines of the drive shaft; and
a cap axially aligned with the drive shaft having an internal splines defined thereon which are adapted to (i) prevent an axial movement of the output shaft relative to the drive shaft when the cap is in a first position and (ii) allow axial movement of the drive shaft relative to the output shaft when the cap is in a second position, the cap including an externally exposed portion and the cap being moveable between the first and second positions in response to selective movement of the externally exposed portion,
wherein the output shaft may be removed from the drive shaft when the cap is placed in the second position by axially sliding the first set of external splines through the internal splines of the cap.

2. The apparatus of claim 1, further comprising a biasing member which biases the cap into the first position.

3. The apparatus of claim 2, wherein the biasing member is a torsional spring.

4. The apparatus of claim 3, further comprising a first pin which secures the a first end of the torsion spring to the drive shaft; and
a second pin which secures a second end of the torsion spring to the cap and engages a slot defined in the drive shaft.

5. The apparatus of claim 1, wherein:
the output shaft has a second set of external splines defined on a first end portion thereof, and
the output shaft has a third set of external splines defined on a second end portion thereof.

6. The apparatus of claim 5, wherein:
the output shaft can be positioned within the drive shaft such the second set of external splines can be used to drive first set of accessories, the output shaft can be removed, and the output shaft can be repositioned within the drive shaft such that the third set of external splines can be used to drive a second set of accessories.

7. The apparatus of claim 5, wherein:

the second set of splines are compatible with Category II agricultural implements, and the third set of splines are compatible with Category III agricultural implements.

8. The apparatus of claim 1, further comprising:

a first groove defined in the drive shaft;

a second groove defined in the cap; and a snap ring, wherein the snap ring is positioned within the first groove and the second groove to retain the cap to the drive shaft.

9. A method of operating a removable shaft assembly, comprising:

providing a drive shaft having internal splines defined therein;

positioning an output shaft having a first set of external splines defined thereon within the drive shaft;

axially aligning a cap having internal splines defined thereon with the drive shaft which (i) prevent an axial movement of the output shaft relative to the drive shaft when the cap is in a first position, and (ii) allow axial movement of the output shaft relative to the drive shaft when the cap is in a second position, the cap including an externally exposed portion and the cap being moveable between the first and second positions in response to selective movement of the externally exposed portion; and removing the output shaft from the drive shaft when the cap is placed in the second position by axially sliding the first set of external splines through the internal splines of the cap.

10. The method of claim 9, further comprising the step of biasing the cap in the first position.

11. The method of claim 10, wherein the biasing step includes interposing a torsional spring between the drive shaft and the cap.

12. The method of claim 11, further comprising the steps of:

securing a first end of the torsion spring to the drive shaft with a first pin; and securing a second end of the torsion spring to the cap.

13. The method of claim 9, further comprising the steps of:

providing a second set of external splines on a first end portion of the output shaft; and providing a third set of external splines on a second end portion of the output shaft.

14. The method of claim 13, further comprising the steps of:

positioning the output shaft within the drive shaft such the second set of external splines can be used to drive first set of accessories;

removing the output shaft; and repositioning the output shaft within the drive shaft such that the third set of external splines can be used to drive a second set of accessories.

15. The method of claim 13, further comprising the steps of:

providing the second set of splines compatible with Category II agricultural implements; and providing the third set of splines compatible with Category III agricultural implements.

16. The apparatus of claim 9, further comprising the steps:

defining a first groove in the drive shaft;

defining a second groove in the cap; and positioning a snap ring within the first groove and the second groove to retain the cap to the drive shaft.

* * * * *